United States Patent
Twardowska-Baxter et al.

(10) Patent No.: US 6,841,607 B2
(45) Date of Patent: Jan. 11, 2005

(54) THERMOSETTING INORGANIC CLAY NANODISPERSIONS AND THEIR USE

(75) Inventors: Helena Twardowska-Baxter, Dublin, OH (US); Rina Singh, Westerville, OH (US); Laurence G. Dammann, Powell, OH (US)

(73) Assignee: Ashland Inc., Dublin, OH (US)

( * ) Notice: Subject to any disclaimer, the term of this patent is extended or adjusted under 35 U.S.C. 154(b) by 27 days.

(21) Appl. No.: 10/288,015

(22) Filed: Nov. 5, 2002

(65) Prior Publication Data

US 2004/0087701 A1 May 6, 2004

(51) Int. Cl.⁷ ................................................. C08K 3/34
(52) U.S. Cl. ...................... 524/445; 524/447; 501/147; 501/145
(58) Field of Search ................................ 524/445, 447, 524/186, 432, 394, 436; 501/147, 148, 146, 145

(56) References Cited

U.S. PATENT DOCUMENTS

| | | | |
|---|---|---|---|
| 4,207,245 A | 6/1980 | Halbert | 260/429.5 |
| 4,810,734 A | 3/1989 | Kawasumi et al. | 523/216 |
| 5,308,808 A * | 5/1994 | Gregar et al. | 501/146 |
| 5,376,604 A | 12/1994 | Iwasaki et al. | 510/146 |
| 5,585,439 A | 12/1996 | Lee et al. | 525/178 |
| 5,853,886 A | 12/1998 | Pinnavaia et al. | 428/403 |
| 6,261,640 B1 * | 7/2001 | Pinnavaia et al. | 427/384 |
| 6,287,992 B1 | 9/2001 | Polansky | 442/59 |
| 2003/0199625 A1 * | 10/2003 | Twardowska et al. | 524/445 |

OTHER PUBLICATIONS

Fukushima, Y. and Inagaki, S., "Synthesis of an Intercalated Compound of Montmorillonite and 6–Polyamide", *Journal of Inclusion Phenomena* 5 (1987), 473–482.

* cited by examiner

Primary Examiner—Katarzyna Wyrozebski
(74) Attorney, Agent, or Firm—David L Hedden

(57) ABSTRACT

This invention relates to thermosetting inorganic clay nanodispersions comprising an inorganic clay and at least one organometallic compound. The thermosetting inorganic clay nanodispersions are used to prepare thermosetting articles.

29 Claims, No Drawings

THERMOSETTING INORGANIC CLAY NANODISPERSIONS AND THEIR USE

CROSS-REFERENCE TO RELATED APPLICATIONS

Not Applicable.

CLAIM TO PRIORITY

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION (1) Field of the Invention

This invention relates to thermosetting inorganic clay nanodispersions comprising an inorganic clay and at least one organometallic compound. The thermosetting inorganic clay nanodispersions are used to prepare thermosetting articles.

(2) Description of the Related Art

A composite is a solid material that results when two or more different materials having their own unique characteristics are combined to create a new material, and the combined properties, for the intended use, are superior to those of the separate starting materials. Typically, the composite is formed by embedding a fibrous material, e.g. glass fibers, into a polymer matrix. While the mechanical properties of a bundle of fibers are low, the strength of the individual fibers is reinforced by the polymer matrix that acts as an adhesive and binds the fibers together. The bound fibers provide rigidity and impart structural strength to the composite, while the polymeric matrix prevents the fibers from separating when the composite is subjected to environmental stress.

The polymeric matrix of the composite is formed from a thermoplastic or thermosetting resin, which is mixed with fibers used to make a composite. Thermoplastic polymers "soften" when heated, and recover their plastic properties when cooled. This reversible process can often be repeated many times. The polymers are thermoplastic because they are not chemically cross-linked. Examples of thermoplastic resins include linear polyethylene, polystyrene, acrylic resins, and nylon.

Thermosetting polymers "set" irreversibly by a curing reaction, and do not soften or melt when heated. The reason they do not soften or melt when they are heated is that they chemically cross-link when they are cured. Examples of thermosetting resins include phenolic resins, unsaturated polyester resins, polyurethane-forming resins, and epoxy resins.

Nanocomposites are composites which are formed by binding materials in the polymeric matrix that have a nanometer size range. Typically, the materials used to form nanocomposites are modified inorganic clays. Thermoplastic molded nanocomposite articles are particularly useful because they have improved mechanical properties, e.g. tensile strength (psi), modulus (ksi), elongation (%), and heat distortion temperature (° C.), when compared to conventional thermoplastic molded composite articles, which are not useful for some applications, e.g. elevated temperature use. Although conventional thermosetting molded composite articles have good mechanical properties, frequently they require improved performance properties.

Typical inorganic clays used in preparing nanocomposites include phyllosilicates such as montmorillonite, nontronite, beidellite, volkonskoite, hectorite, saponite, sauconite, magadiite, and kenyaite; vermiculite; and the like. Inorganic clays are typically multi-layered structures where the layers are close in proximity and contain cations of alkali metals or alkaline earth metals, e.g. sodium, potassium, or calcium, between the layers of the inorganic clay. The distance between the layers of the clay is the so-called "d-spacing". Conventionally, in order to prepare nanocomposites from the inorganic clay, the inorganic clay, which is hydrophilic, is treated with water to "swell" the inorganic clay and thereby expand the d-spacing between the layers of the inorganic clay. The swollen clay is then treated with an intercalation agent, e.g. a quaternary ammonium salt, to render the inorganic clay organophilic (i.e. make the inorganic clay compatible with thermoplastic or thermosetting monomers and/or resins) and further increase the d-spacing by exchanging the cations of the inorganic clay with the cations of the intercalation agent. The intercalated inorganic clay is then recovered and dried. The treatment process is cumbersome and adds considerably to the cost of producing intercalated inorganic clays. The dried intercalated inorganic clay is then mixed with a thermoplastic polymer or thermosetting monomer or resin, which exfoliates (separates) some or all of the layers of the inorganic clay. In the case of thermoset resins, the mixture is cured by contacting with a curative and/or curing catalyst.

In order to form an article from the exfoliated inorganic clay, a filler is typically mixed with the exfoliated inorganic clay. Examples of fillers are silicas, talc, calcium carbonate, and aluminas. This mixture is then shaped by introducing it into a pattern. Thermoplastic mixtures are injected into the pattern in a molten state at elevated temperatures and form a nanocomposite article upon cooling. Thermosetting mixtures are introduced into the pattern in a liquid or flowable state, then cured (crosslinked) with a curative and/or curing catalyst to produce a shaped nanocomposite article.

As was mentioned previously, typically nanocomposite articles have good mechanical properties. However, if thermosetting nanocomposite articles could be produced with superior properties, these articles could replace conventional thermoset composite articles, e.g. sheet molding compounds (SMC).

All citations referred to under this description of the "Related Art" and in the "Detailed Description of the Invention" are expressly incorporated by reference.

BRIEF SUMMARY OF THE INVENTION

This invention relates to thermosetting inorganic clay nanodispersions comprising an inorganic clay and at least one organometallic compound. The thermosetting inorganic clay nanodispersions are used to prepare thermosetting articles.

The organometallic compound acts as an intercalating agent. Thus, it causes the d-spacing of the layers of the inorganic clay of the nanodispersions to increase, as shown by X-ray diffraction. The inorganic clay of the nanodispersion is partially or totally intercalated inorganic clay, i.e. the inorganic cations of the inorganic clay are partially or totally displaced with the cations of the organometallic compound. Thermosetting inorganic clay nanodispersions are used to prepare thermosetting articles.

Thermosetting articles prepared with the thermosetting inorganic clay nanodispersions prepared with metallic diacrylates and dimethacrylates show improvements when compared to thermosetting inorganic clay nanodispersions prepared with intercalating agents known in the art, e.g. quaternary ammonium salts. These improvements include:

(a) they are thermally stable at temperature up to 250° C., whereas those prepared with ammonium salts are typically stable up to 190° C. to 200° C.;

(b) the alkyl ammonium salts act as plastisizers and tend to decrease mechanical and thermal properties of the thermoset articles prepared with the inorganic clay nanodispersions, while metallic diacrylates and dimethacrylates tend to improve these properties;

(c) the metallic diacrylate and dimethacrylates improve adhesion between dissimilar surfaces, e.g. organic and inorganic surfaces; and/or (d) alkyl ammonium salts frequently cause foaming, which makes processing the thermoset articles more difficult.

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention that enable one skilled in the art to practice the invention, including the best mode. It is contemplated that many equivalent embodiments of the invention will be operable besides these specifically disclosed.

The treated inorganic clay used to practice this invention is unique because the intercalating agent used to prepare the treated clay comprises at least one organometallic compound. The organometallic compounds used as the intercalating agent are represented by the following chemical structure:

where "X" is $Zn^{+2}$, $Mg^{+2}$, or $Ca^{+2}$, or another divalent metal cation, and where "$R_1$" and "$R_2$" are individually saturated or unsaturated unsubstituted carboxylic acids, or carboxylic acids with functional groups, e.g. hydroxyl, amino, isocyanato, ester, cyano, nitro, etc. Preferably "$R_1$" and "$R_2$" are individually selected from the group consisting of acrylate, methacrylate, $C_1$ to $C_8$ aliphatic carboxylic acids, benzoic acid, alpha and beta amino acids, substituted benzoic acids, naphthalene carboxylic acids, dicarboxylic acids, such as phthalic acid, isophtalic acid, terephthalic acid, maleic acid, fumaric acid, malonic acid, succinic acid, and tricarboxylic acids, such as citric acid. Preferably used as the intercalating agent are organometallic compounds selected from the group consisting of zinc acrylate stearate, zinc diacrylate, zinc dimethacrylate, calcium diacrylate, and mixtures thereof.

The organometallic intercalating agent can be used in combination with other known intercalation agents, preferably quaternary ammonium salts. Typically, the quaternary ammonium salts (cationic surface active agents) have from 6 to 30 carbon atoms in the alkyl groups, e.g. alkyl groups such as octadecyl, hexadecyl, tetradecyl, dodecyl or like moieties; with preferred quaternary ammonium salts including octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt and the like.

The amount of intercalating agent used can vary over wide ranges, but is typically used in amount sufficient to replace from 35 to 100 percent of the cations of the inorganic clay with the cations of the intercalating agent. Typically, the amount of intercalating agent is from 10 to 60 parts by weight based on 100 parts by weight of inorganic clay, and preferably form 20 to 40 parts by weight based on 100 parts by weight of inorganic clay. The weight ratio of organometallic intercalating agent to other intercalating agent can vary over wide ranges, but is typically from 100 to 0, preferably from 80 to 20, and most preferably from 60 to 40. The ratio depends mostly on the monomer/polymer system and desired properties.

The intercalating agent is typically added directly to the inorganic clay when the treated inorganic clay is prepared by ion exchange, but is preferably first mixed with the monomer and/or resin used to facilitate intercalation when the treated inorganic clay is prepared in situ.

Typically, treated inorganic clays are prepared from layered inorganic clays such as phyllosilicates, e.g. montmorillonite, nontronite, beidellite, volkonskoite, hectorite, saponite, sauconite, magadiite, and kenyaite; vermiculite; and the like. Other representative examples include illite minerals such as ledikite; the layered double hydroxides or mixed metal hydroxides; chlorides. Other layered materials or multi-layer aggregates having little or no charge on the surface of the layers may also be used in this invention provided they can be intercalated to expand their interlayer spacing. Mixtures of one or more such materials may also be employed.

Preferred layered inorganic clays are those having charges on the layers and exchangeable ions such as sodium, potassium, and calcium cations, which can be exchanged, preferably by ion exchange, with ions, preferably cations such as ammonium cations, or reactive organosilane compounds, that cause the multi-lamellar or layered particles to delaminate or swell. The most preferred layered inorganic clay is montmorillonite.

The treated inorganic clay can be prepared by ion exchange in a separate step. This method first involves "swelling" clay with water or some other polar solvent, and then treating it with an intercalating agent. The function of the intercalating agent is to increase the "d-spacing" between the layers of the inorganic clay. The organophilic clay is then isolated and dried.

The treated clays can also be prepared in situ without ion exchange. The in situ treated clay is prepared by mixing a layered inorganic clay with a monomer or resin that facilitates intercalation, and an intercalating agent. In these treated clays, the cations replaced by the intercalating agent remain in the mixture.

Examples of monomers that can be used to facilitate intercalation include acrylic monomers, styrene, vinyl monomers (e.g. vinyl acetate), isocyanates (particularly organic polyisocyanates), polyamides, and polyamines. Examples of resins that can be used to facilitate intercalation include phenolic resins (e.g. phenolic resole resins; phenolic novolac resins; and phenolic resins derived from resorcinol, cresol, etc.); polyamide resins; epoxy resins, e.g. resins derived from bisphenol A, bisphenol F, or derivatives thereof, epoxy resins derived from the diglycidyl ether of bisphenol A or a polyol with epichlorohydrin; polyfunctional amines, e.g., polyalkylenepolyamine; and unsaturated polyester resins, e.g. reaction products of unsaturated dicarboxylic acids or their anhydrides and polyols. Examples of suitable unsaturated polyesters include the polycondensation products of (1) propylene glycol and maleic anhydride and/or fumaric acids; (2) 1,3-butanediol and maleic anhydride and/or fumaric acids; (3) combinations of ethylene and propylene glycols (approximately 50 mole percent or less of ethylene glycol) and maleic anhydride and/or fumaric acid; (4) propylene glycol, maleic anhydride and/or fumaric acid and saturated dibasic acids, such as o-phthalic, isophthalic, terephthalic, succinic, adipic, sebacic, methyl-succinic, and the like. Preferably, styrene is used to facilitate intercalation.

An in situ treated clay is preferred because of its lower cost and it allows flexibility of design when preparing thermosetting composites such as SMC, i.e. the intercalating agent can be selected to match the structure of the resin and have functional groups reactive with the resin. Additionally, the amount of intercalating agent can be varied in the range 5–50% per weight of the clay to obtain desired properties. A greater amount of intercalating agent provides more complete dispersion of the clays. This can yield significant improvements in the molding formulation, such as improved mechanical properties and increased transparency leading to moldings more easily pigmented.

Although any thermosetting resin can be used in the composite, preferably used are phenolic resins, unsaturated polyester resins, vinyl ester resins, polyurethane-forming resins, and epoxy resins.

Most preferably used as the thermosetting resin are unsaturated polyester resins. Unsaturated polyester resins are the polycondensation reaction product of one or more dihydric alcohols and one or more unsaturated polycarboxylic acids. The term "unsaturated polycarboxylic acid" is meant to include unsaturated polycarboxylic and dicarboxylic acids; unsaturated polycarboxylic and dicarboxylic anhydrides; unsaturated polycarboxylic and dicarboxylic acid halides; and unsaturated polycarboxylic and dicarboxylic esters. Specific examples of unsaturated polycarboxylic acids include maleic anhydride, maleic acid, and fumaric acid. Mixtures of unsaturated polycarboxylic acids and saturated polycarboxylic acids may also be used. However, when such mixtures are used, the amount of unsaturated polycarboxylic acid typically exceeds fifty percent by weight of the mixture.

Examples of suitable unsaturated polyesters include the polycondensation products of (1) propylene glycol and maleic anhydride and/or fumaric acids; (2) 1,3-butanediol and maleic anhydride and/or fumaric acids; (3) combinations of ethylene and propylene glycols (approximately 50 mole percent or less of ethylene glycol) and maleic anhydride and/or fumaric acid; (4) propylene glycol, maleic anhydride and/or fumaric acid and saturated dibasic acids, such as o-phthalic, isophthalic, terephthalic, succinic, adipic, sebacic, methyl-succinic, and the like. In addition to the above-described polyester one may also use dicyclopentadiene modified unsaturated polyester resins as described in U.S. Pat. No. 3,883,612. These examples are intended to be illustrative of suitable polyesters and are not intended to be all-inclusive. The acid number to which the polymerizable unsaturated polyesters are condensed is not particularly critical with respect to the ability of the low-profile resin to be cured to the desired product. Polyesters, which have been condensed to acid numbers of less than 100 are generally useful, but acid numbers less than 70, are preferred. The molecular weight of the polymerizable unsaturated polyester may vary over a considerable range, generally those polyesters useful in the practice of the present invention having a molecular weight ranging from 300 to 5,000, and more preferably, from about 500–5,000.

The SMC formulation preferably contains an ethylenically unsaturated (vinyl) monomer, which copolymerizes with the unsaturated polyester. Examples of such monomers include acrylate, methacrylates, methyl methacrylate, 2-ethylhexyl acrylate, styrene, divinyl benzene and substituted styrenes, multi-functional acrylates and methacrylates such as ethylene glycol dimethacrylate or trimethylol propanetriacrylate. Preferably used as the ethylenically unsaturated monomer is styrene. The ethylenically unsaturated monomer is usually present in the range of about 5 to 50 parts per 100 parts by weight, based upon the weight of the unsaturated resin, low profile additive, and the unsaturated monomer, preferably 20 to about 45 parts per 100 parts by weight, and more preferably from about 35 to about 45 parts per 100 parts by weight. The vinyl monomer is incorporated into the composition generally as a reactive diluent for the unsaturated polyester.

Typically, the SCM formulation contains a low profile additive (LPA) to the formulation as aid to reduce the shrinkage of molded articles prepared with the SMC. The LPA's used in the SMC are typically thermoplastic resins. Examples of suitable LPA's include saturated polyesters, polystyrene, urethane linked saturated polyesters, polyvinyl acetate, polyvinyl acetate copolymers, acid functional polyvinyl acetate copolymers, acrylate and methacrylate polymers and copolymers, homopolymers and copolymers include block copolymers having styrene, butadiene and saturated butadienes e.g. polystyrene.

The SMC also contains a reinforcing agent, preferably a fibrous reinforcing agent. Fibrous reinforcing agents are added to the SMC to impart strength and other desirable physical properties to the molded articles formed from the SMC. Examples of fibrous reinforcements that can be used in the SMC include glass fibers, asbestos, carbon fibers, polyester fibers, and natural organic fibers such as cotton and sisal. Particularly useful fibrous reinforcements include glass fibers which are available in a variety of forms including, for example, mats of chopped or continuous strands of glass, glass fabrics, chopped glass and chopped glass strands and blends thereof. Preferred fibrous reinforcing materials include 0.5, 1, and 2-inch fiberglass fibers.

The SMC preferably contains a filler. The filler may be a low-density filler having a density of 0.5 $g/cm^3$ to 1.7 $g/cm^3$, preferably from 0.7 $g/cm^3$ to 1.3 $g/cm^3$, e.g. diatomaceous earth, hollow microspheres, ceramic spheres, and expanded perlite and vermiculate, and/or a higher-density filler, e.g. calcium carbonate, mica, vollastonite, talc, kaolin, carbon, silica, and alumina.

The thermosetting sheet molding compositions typically comprise (a) from about 30 to 50 parts of thermosetting resin, preferably from about 35 to 45 parts; (b) from about 1 to 10 of treated inorganic clay, preferably from about 2 to 6 parts; (c) from about 10 to 40 parts of low profile additive (preferably as a 50% solution in styrene), preferably from about 15 to 30 parts; (d) from 15 to 40 parts of fiber glass, preferably from about 25 to 35 parts; and (e) from 0 to 65 parts of an inorganic filler, preferably from about 20 to 30 parts, where the parts are based upon 100 parts of the SMC resin formulation.

The SMC also preferably contains an organic initiator. The organic initiators are preferably selected from organic peroxides which are highly reactive and decomposable at the desired temperature and having the desired rate of curing. Preferably, the organic peroxide is selected from those, which are decomposable at temperatures from about 50° C. to about 120° C. The organic peroxides to be used in the practice of the invention are typically selected from tertiary butyl peroxy 2-ethylhexanoate; 2,5-dimethyl-2,5-di(-benzoylperoxy)cyclohexane; tertiary-amyl 2-ethylhexanoate and tertiary-butyl isopropyl carbonate; tertiary-hexylperoxy 2-ethylhexanoate; 1,1,3,3-tetramethylbutylperoxy 2-ethylhexanoate; tertiary-hexylperoxypivalate; tertiarybutylperoxy pivalate; 2,5-dimethyl-2,5-di(2-ethylhexanoylperoxy) cyclohexane; dilauroyl peroxide; dibenzoyl peroxide; diisobutyryl peroxide; dialkyl peroxydicarbonates such as diisopropyl peroxydicarbonate, di-n-propyl peroxydicarbonate, di-sec-butyl peroxydicarbonate, dicyclohexyl peroxydicarbonate; VAZ052, which is 2,2'-azobis(2,4-dimethyl-valeronitrile); di-4-tertiarybutylcyclohexyl peroxydicarbonate and di-2 ethylhexyl peroxydicarbonate and t-butylperoxy esters, such as tertiary butylperpivalate and teriarybutylper pivalate and eodecanoate. More preferably, the initiators are di-(4-tert-butyl-cyclohexyl) peroxydicarbonate and dibenzoyl peroxide. Most preferably, the initiator is dibenzoyl peroxide used as a solution or a paste rather than in dry form. The initiators are used in a proportion that totals from about 0.1 parts to about 8 parts per 100 parts by weight, preferably from about 0.1 to about 5 parts per 100 parts by weight, and more preferably from about 0.1 to about 4 parts per 100 parts by weight.

The SMC may also contain a stabilizer or inhibitor. The stabilizers preferably are those having high polymerization inhibiting effect at or near room temperature. Examples of suitable stabilizers include hydroquinone; toluhydroquinone; di-tertiarybutylhydroxytoluene (BHT); para-tertiarybutylcatechol (TBC); mono-tertiarybutylhydroquinone (MTBHQ); hydroquinone monomethyl ether; butylated hydroxyanisole (BHA); hydroquinone; and parabenzoquinone (PBQ). The stabilizers are used in a total amount ranging from about 0.1 to about 4.0 parts per 100 parts, preferably from about 0.1 to about 3.0 parts per 100 parts and more preferably from about 0.1 to about 2 parts by weight per 100 parts by weight of the unsaturated polyester.

The sheet molding composition may further include a thickening agent such as oxides, hydroxides, and alcoholates of magnesium, calcium, aluminum, and the like. The thickening agent can be incorporated in a proportion ranging from about 0.05 parts to about 5 parts per 100 parts by weight, based on the weight of the unsaturated polyester resin, preferably from about 0.1 parts to about 4 parts per 100 parts by weight and more preferably, from about 1 part to about 3 parts per 100 parts by weight. Additionally or alternatively, the SMC may contain isocyanate compounds and polyols or other isocyanate reactive compounds, which may be used to thicken the SMC.

The SMC may also contain other additives, e.g. cobalt promoters (Co), nucleating agents, lubricants, plasticizers, chain extenders, colorants, mold release agents, antistatic agents, pigments, fire retardants, and the like. The optional additives and the amounts used depend upon the application and the properties required.

The SMC are useful for preparing molded articles, particularly sheets and panels. The sheets and panels may be shaped by conventional processes such as vacuum processing or by hot pressing. The SMC are cured by heating, contact with ultraviolet radiation, and/or catalyst, or other appropriate means. The sheets and panels can be used to cover other materials, for example, wood, glass, ceramic, metal, or plastics. They can also be laminated with other plastic films or other protective films. They are particularly useful for preparing parts for recreational vehicles, automobiles, boats, and construction panels.

The detailed description and examples will illustrate specific embodiments of the invention that enable one skilled in the art to practice the invention, including the best mode. It is contemplated that many equivalent embodiments of the invention will be operable besides these specifically disclosed.

Abbreviations

The following abbreviations are used:

A7221 resin=isophthalic resin manufactured by Ashland Specialty Chemical Company.
BP=benzoyl peroxide, a curing catalyst.
CL-10A=an inorganic modified clay prepared by ion exchange that involves swelling CLNA with water and then intercalation with DMBTAC, such that the weight ratio of CLNA/DMBTAC is about 70:30, commercially available from the Southern Clay Products.
CLNA=an untreated inorganic clay, which has not been treated with water or a quaternary ammonium salt (i.e. is not intercalated), commercially available from the Southern Clay Products.

DMBTAC=dimethyl benzyl tallow ammonium chloride.

DCPD resin=dicyclopentadiene unsaturated polyester resin (D1657-HV1) manufactured by Ashland Specialty Chemical, a division of Ashland Inc.

ELG (%)=elongation of test molded article measured by Instron Model 4204.

HDT (° C.)=heat distortion temperature measured by Heat Distortion Tester Vista 6.

MC=Mineral Colloid, a commercial clay from Southern Clay Products, which is less purified than CLNA and less expensive.

SARTOMER 705=zinc diacrylate supplied by Sartomer.

SARTOMER 706=zinc diacrylate with some zinc stearate, an organometallic intercalating agent supplied by Sartomer.

SARTOMER 708=zinc dimethacrylate supplied by Sartomer.

SARTOMER 636=calcium diacrylate supplied by Sartomer.

STY=styrene monomer.

T/S=tensile strength of molded article measured by Instron Model 4204.

UPE=unsaturated polyester resin

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application, all units are in the metric system and all amounts and percentages are by weight, unless otherwise indicated.

As a preliminary note, data indicate that intercalated inorganic clay cannot be effectively prepared by just adding the intercalation agent to the inorganic clay. According to the prior art, treated inorganic clays are typically prepared by ion exchange. This method involves adding water to the inorganic clay to swell the clay (increase d-spacing), so the quaternary intercalating agent (usually an ammonium salt) can effectively intercalate the inorganic clay. See Table I, which summarizes experiments showing the effect of different variables on increasing d-spacing. The d-spacing was determined from x-ray diffraction patterns collected with a Siemens D 500 Diffractometer using a monochromated copper x-ray source operating at 30 mA/40KV.

Control
(CLNA Clay)

The d-spacing of CLNA, a clay swollen with water, but not treated with an intercalating agent, was measured. The data in Table I indicate that there is a slight increase in d-spacing, but the d-spacing reverts to the initial value after drying.

Comparison Example A
(CLNA Clay Treated with DMBTAC by Adding Intercalating Agent Directly to Clay)

20 parts of CLNA were treated with 8 parts of DMBTAC. The data in Table I indicate that there was an increase in d-spacing.

Example 1
(Preparation of Treated Inorganic Clay by Ion Exchange Using only an Organometallic Compound as the Interclating Agent)

CLNA, after being swollen with water, was treated with SARTOMER 706 as the intercalating agent. In a reaction vessel, 2 g of SARTOMER 706 and 8 g of CLNA were mixed in dionized water with agitation for 2 hours. The mixture was opaque and had a high viscosity at 60° C. The treated clay was filtered, washed with water, dried, ground and screened through 350 mesh. The d-spacing of the treated clay is given in Table I.

Example 2
(Preparation of Treated Inorganic Clay In Situ Using only an Organometallic Compound as the Interclating Agent)

A treated inorganic clay was prepared using SARTOMER 706 as the intercalating agent. In a reaction vessel, 2 g of SARTOMER 706 was dissolved in 60 g of styrene. Then 8 g of inorganic clay CLNA was added with agitation. The mixture was opaque and had a low viscosity. The d-spacing of the treated clay is given in Table I.

Example 3
(Preparation of Treated Inorganic Clay Prepared In Situ Using a Mixture of an Organometallic Compound and Ammonium Compound as the Interclating Agent)

The procedure of Example 2 was followed, except the intercalating agent used was a mixture of SARTOMER 706 and DMBTAC in a weight ratio of 60 to 20. The d-spacing of the treated clay is given in Table I.

TABLE I (d-spacing values of modified inorganic clay materials)

| Example | Clay | Intercalating Agent | d-spacing in gel with monomer (Å) | d-spacing of dried clay (Å) | Intensity d-spacing in UPE casting (Å) |
|---------|------|---------------------|-----------------------------------|-----------------------------|----------------------------------------|
| Control 1 | CLNA | None | 12.4 in water | 10.1 | 10.4 (high intensity) |
| Control 2 | CLNA | None | 12.1 in styrene | 10.3 | |
| A | CLNA | DMBTAC | 35.4 in styrene | 18.6 | 13.6 (very low intensity) |
| 1 | CLNA | SARTOMER 706 | 21.3 in water | 13.4 | 12.4 (very low intensity) |

TABLE I-continued (d-spacing values of modified inorganic clay materials)

| Example | Clay | Intercalating Agent | d-spacing in gel with monomer (Å) | d-spacing of dried clay (Å) | Intensity d-spacing in UPE casting (Å) |
|---|---|---|---|---|---|
| 2 | CLNA | SARTOMER 706 | 21.5 in styrene | 12.7 | 12.9 (very low intensity) |
| 3 | CLNA | SARTOMER 706/ DMBTAC | 35.0 in styrene | 18.1 | 13.8 (very low intensity) |

The x-ray diffraction (XRD) peaks of Cloisite Na in gel and dry powder have very high intensity. The data in Table I indicate that there is little or no increase in d-spacing when CLNA is used without an intercalating agent. The use of DMBTAC, SARTOMER 706, and a mixture of DMBTAC and SARTOMER 706 increases d-spacing.

Table I shows that d-spacing of dry clay is the highest with DMBTAC because of its long aliphatic tail ($C_{18}$). On the other hand, because the zinc diacrylate molecule is rather small, the d-spacing is not very high. (The amount of stearic acid in SR 706 is so little that it does not affect d-spacing.) Nevertheless, the zinc diacrylate makes the surface of clay organophilic, so it becomes compatible with monomers and resins. Thus, the nanoclay treated with SR 706 swells in monomers such as styrene, methyl methacrylate, and allows large molecules of unsaturated polyester resin to enter clay galleries. This could lead to exfoliation of clay during polymerization of resin, resulting in loss of crystallinity of clay. Therefore, XRD patterns of UPE casting show very low intensity peaks corresponding to intercalated structures of clay.

The addition of the DMBTAC to the zinc diacrylate improves dispersion of nanoclay in monomer or monomer/resin system and prevents settling of clay during storage. This feature is important in applications when long storage of dispersion is required.

Examples B and 4–6
(Preparation of Castings with the Treated Inorganic Clays of Examples 1 and 2)

The treated clays of Examples A, and 1–3 were used to make clear castings with an unsaturated polyester. Tests were conducted to determine the thermal and mechanical properties of the castings to see how useful the treated clays were in making castings. To prepare the test castings, 2 g of compatibilizer is dissolved in 60 g of styrene. Then 8 g of inorganic clay Cloisite Na from Southern Clay Products was added with agitation. The mixture has high viscosity and looks transparent when DMBTAC is used or opaque when only Sartomer 706 is used.

Then 80 g of dicyclopentadiene polyester resin (D1657-HV1), manufactured by Ashland Specialty Chemical Company, a division of Ashland Inc., is added to reduce the viscosity. The components were then mixed using high shear agitation for 15 minutes at 6000 rpm. The organically treated clay is formed in situ during this step. Then an additional 100 g of D1657-HV1 is added and mixed thoroughly for 30 minutes. This is to maintain the desired styrene to polyester ratio. The samples of some styrene gels were studied with XRD to determine d-spacing of clay with different intercalating agents.

The above mixtures were used to prepare clear castings for XRD analysis and thermal and mechanical testing. The casting were prepared using 1% of benzoyl peroxide and curing at elevated temperature as follows:

0.5 hr at 57° C.
0.5 hr at 63° C.
1 hr at 71° C.
2 hrs at 82° C.
postcure for 2 hrs at 150° C.
The results are summarized in Table II.

TABLE II (Physical and mechanical properties of nanocomposite articles prepared with treated clays

| Example | Clay | T/S (psi) | MOD (ksi) | ELG (%) | HDT (° C.) |
|---|---|---|---|---|---|
| B | A | 6520 | 598 | 1.16 | 90 |
| 4 | 1 | 7005 | 682 | 1.15 | 97 |
| 5 | 2 | 7240 | 695 | 1.20 | 96 |
| 6 | 3 | 6470 | 656 | 1.20 | 94 |

The results in Table II show that the casting made with the nanodispersion using SARTOMER 706 had increased tensile strength (10–15%), increased modulus (30–40%), and essentially unchanged elongation. HDT is increased by 6° C. with only 0.8% Sartomer SR706. Larger increases are possible with higher concentration of SR706. There is some decrease in mechanical properties of UPE when DMBTAC is added because of its plasticizing effect on UPE.

TABLE III (Example of clear casting showing different resin and different zinc diacrylate)

| Example | Sample description | Tensile Strength (psi) | Modulus (ksi) | Elongation (%) | HDT (° C.) |
|---|---|---|---|---|---|
| 7 | A7221 Resin | 10025 | 594 | 2.20 | 110 |
| 8 | A7221 + 0.8% DMBTAC + | 8904 | 665 | 1.57 | 108 |

TABLE III-continued (Example of clear casting showing different resin and different zinc diacrylate)

| Example | Sample description | Tensile Strength (psi) | Modulus (ksi) | Elongation (%) | HDT (° C.) |
|---|---|---|---|---|---|
| 9 | 3.2% Cloisite Na A7221 + 2% SR705 | 9685 | 571 | 1.97 | 115 |
| 10 | A7221 + 0.8% DMBTAC + 3.2% Cloisite Na + 2% SR705 | 10121 | 661 | 2.06 | 116 |

The results in Table III show that addition of nanoclay with zinc diacrylate increases modulus by about 10% and HDT by 6° C. of a clear casting with isophthalic resin A7221 without decreasing strength and elongation. This is a high performance resin and improvements are very difficult to obtain. Further improvements are possible by increasing concentration of nanoclay and zinc diacrylate.

Examples of SCM Formualtions

In Examples 11–16, several SMC pastes were formed. The formulations are described in Table IV. The preparation procedure is as follows:

The metallic diacrylate is dissolved in low profile additive (LPA) solution in styrene and then inorganic clay is added with agitation. The unsaturated polyester resin is added and mixed for about 30 minutes under high shear agitation to ensure complete intercalation of the clay. Any air bubbles entrapped during mixing are removed by vacuum degassing or other appropriate methods. The remaining components of the SMC paste are added and thoroughly mixed. The resulting mixture has a viscosity of 30,000–40,000 cPs, which is required for SMC processing.

TABLE IV (SMC formulations)

|  | Control | 11 | 12 | 13 | 14 | 15 | 16 |
|---|---|---|---|---|---|---|---|
| Vinyl ester A2005 | 80 | 80 | 80 | 80 | 80 | 80 | 80 |
| LPA NP2000 | 20 | 20 | 20 | 20 | 20 | 20 | 20 |
| Pigment CM20540 | 3.5 | 3.5 | 3.5 | 3.5 | 3.5 | 3.5 | 3.5 |
| Zinc stearate | 4.5 | 4.5 | 4.5 | 4.5 | 4.5 | 4.5 | 4.5 |
| TBPB | 1.3 | 1.3 | 1.3 | 1.3 | 1.3 | 1.3 | 1.3 |

TABLE IV-continued (SMC formulations)

|  | Control | 11 | 12 | 13 | 14 | 15 | 16 |
|---|---|---|---|---|---|---|---|
| Cloisite Na |  |  | 3.2 | 3.2 | 3.2 | 3.2 |  |
| Mineral Colloid |  |  |  |  |  |  | 2.0 |
| Calcium carbonate W4 | 145 | 145 | 145 | 145 | 145 | 145 | 145 |
| Sartomer SR705 |  | 5 | 2 | 5 |  |  | 4 |
| Sartomer SR708 |  |  |  |  | 5 |  |  |
| Sartomer SR636 |  |  |  |  |  | 2 |  |

Preliminary tests were conducted by molding the SMC pastes into test panels and curing them in a Carver Laboratory Press at about 150° C. Then the mechanical and thermal properties of the molded plates were determined using DMA (Dynamic Mechanical Analysis). These preliminary tests, based on the paste, estimate how effective a SMC will be in making molded articles.

In other tests, SMC were prepared by adding fiberglass to pastes (about 35 percent fiberglass by weight, based on the weight of the paste). Test plaques were prepared by forming the SMC on a 24-inch SMC machine and compression molding flat plaques at 150° C. and 1000 psi pressure for 2 minutes. The 12-inch by 12-inch test plaques were evaluated for cold part to cold mold shrinkage, surface quality, and standard mechanical and thermal properties, such as Tg (glass transition temperature) and moduli.

The test results were generated from tests on samples containing fiberglass. The test results were generated by, the Dynamic Mechanical Analysis using General Motors procedure GMP.UP.018 and are summarized in Table V.

TABLE V (Thermal and mechanical properties of SMC based on vinyl ester resin A2005 with nanoclays and other additives)

| Example | SMC formulation | Tan Δ 1st Scan (° C.) | Tan Δ 2nd Scan (° C.) | HDT under load (° C.) | Flex Modulus at 150° C. 1st Scan (GPa) | Flex Modulus at 150° C. 2nd Scan (GPa) |
|---|---|---|---|---|---|---|
| Control | Control | 177.4 | 182.6 | 121.6 | 1.31 | 1.68 |
| 17 | 11 | 186.1 | 189.6 | 131.2 | 1.95 | 2.28 |
| 18 | 12 | 185.1 | 187.3 | 130.4 | 1.97 | 2.25 |
| 19 | 13 | 190.7 | 194.4 | 133.7 | 2.37 | 2.56 |
| 20 | 14 | 185.0 | 189.6 | 134.4 | 2.01 | 2.31 |
| 21 | 15 | 186.7 | 190.3 | 127.3 | 2.06 | 2.53 |
| 22 | 16 | >200 | 211.1 | 139.6 | 2.59 | 2.82 |

The data in Table V show that both formulations with and without fiber glass show significant increase in Tg as determined by Tan Δ with the addition of nanoclay and metallic diacrylates. Also flexural modulus at elevated temperature is significantly increased, especially in formulations without fiber.

We claim:

1. A thermosetting inorganic clay nanodispersion comprising an inorganic clay having more than one layer and an organometallic compound selected from the group consisting of zinc acrylate stearate, zinc diacrylate, zinc dimethacrylate, calcium diacrylate, and mixtures thereof in an amount sufficient to partially or totally intercalate the layers of inorganic clay.

2. The thermosetting clay nanodispersion of claim 1 wherein the inorganic clay is treated by ion exchange prior to the addition of the organometallic compound.

3. The thermosetting inorganic clay nanodispersion of claim 2 wherein the nanodispersion is prepared in situ by contacting the inorganic clay with a mixture of the organometallic compound and an intercalation facilitating agent.

4. The thermosetting inorganic clay nanodispersion of claim 3 wherein the intercalation facilitating agent is a monomer and/or resin that is compatible with the inorganic clay.

5. The thermosetting inorganic clay nanodispersion of claim 4 wherein the inorganic clay is montmorillonite clay.

6. The thermosetting inorganic clay nanodispersion of claim 5 wherein the intercalation facilitating agent is selected from the group consisting of styrene monomer, acrylic monomer, epoxy resins, and polyols.

7. The thermosetting inorganic clay nanodispersion comprising the inorganic clay nanodispersion of claim 1, 2, 3, 4, 5, or 6 and a curative.

8. The thermosetting inorganic clay nanodispersion comprising the inorganic clay nanodispersion of claim 7 and a curative.

9. The thermosetting inorganic clay nanodispersion of claim 8 wherein styrene is used as the agent that facilitates intercalation, an unsaturated polyester is used as the curative, and a peroxide is used as the catalyst at elevated temperatures.

10. The thermosetting inorganic nanodispersion of claim 8 wherein an epoxy resin is used as the resin that facilitates intercalation and a polyamide is used as the curative with a tertiary amine as a catalyst.

11. The thermosetting inorganic nanodispersion of claim 8 wherein a polyol is used as the resin that facilitates intercalation, an organic polyisocyanate is used as the as the curative, and a tertiary amine is used as the catalyst.

12. The thermosetting inorganic nanodispersion of claim 8 wherein an epoxy resin is used as the resin that facilitates intercalation, a polyfunctional amine is used as the curative.

13. A molding composition comprising the thermosetting inorganic nanodispersion of claim 8 and a filler.

14. A molding composition comprising the thermosetting inorganic nanodispersion of claim 9 and a filler.

15. A molding composition comprising the thermosetting inorganic nanodispersion of claim 10 and a filler.

16. A molding composition comprising the thermosetting inorganic nanodispersion of claim 11 and a filler.

17. A molding composition comprising the thermosetting inorganic nanodispersion of claim 12 and a filler.

18. The molding composition of claim 13, which further comprises a low profile additive.

19. The molding composition of claim 14, which further comprises a low profile additive.

20. The molding composition of claim 15, which further comprises a low profile additive.

21. The molding composition of claim 16 which further comprises a low profile additive.

22. The molding composition of claim 17 which further comprises a low profile additive.

23. The molding composition of claim 18 which further comprises a low profile additive.

24. The molding composition of claim 18 comprising:

(a) from 30 to 50 parts of thermosetting resin;
(b) from 1 to 10 parts of treated inorganic clay;
(c) from 10 to 40 parts of a low profile additive;
(d) from 15 to 40 parts of fiber glass; and
(e) from 0 to 65 parts of an inorganic filler,
wherein said parts by weight are based on 100 parts of molding composition.

25. The molding composition of claim 19 comprising:

(a) from 30 to 50 parts of thermosetting resin;
(b) from 1 to 10 parts of treated inorganic clay;
(c) from 10 to 40 parts of a low profile additive;
(d) from 15 to 4 parts of fiber glass; and
(e) from 0 to 65 parts of an inorganic filler,
wherein said parts by weight are based on 100 parts of molding composition.

26. The molding composition of claim 20 comprising:

(a) from 30 to 50 parts of thermosetting resin;
(b) from 1 to 10 parts of treated inorganic clay;
(c) from 10 to 40 parts of a low profile additive;
(d) from 15 to 40 parts of fiber glass; and
(e) from 0 to 65 parts of an inorganic filler,
wherein said parts by weight are based on 100 parts of molding composition.

27. The molding composition of claim 21 comprising:

(a) from 30 to 50 parts of thermosetting resin;
(b) from 1 to 10 parts of treated inorganic clay;
(c) from 10 to 40 parts of a low profile additive;
(d) from 15 to 40 parts of fiber glass; and
(e) from 0 to 65 parts of an inorganic filler,
wherein said parts by weight are based on 100 parts of molding composition.

28. The molding composition of claim 22 comprising:

(a) from 30 to 50 parts of thermosetting resin;
(b) from 1 to 10 parts of treated inorganic clay;
(c) from 10 to 40 parts of a low profile additive;
(d) from 15 to 40 parts of fiber glass; and
(e) from 0 to 65 parts of an inorganic filler,
wherein said parts by weight are based on 100 parts of molding composition.

29. The molding composition of claim 23 comprising:

(a) from 30 to 50 parts of thermosetting resin;
(b) from 1 to 10 parts of treated inorganic clay;
(c) from 10 to 40 parts of a low profile additive;
(d) from 15 to 40 parts of fiber glass; and
(e) from 0 to 65 parts of an inorganic filler,
wherein said parts by weight are based on 100 parts of molding composition.

* * * * *